(12) United States Patent
Uttaro

(10) Patent No.: US 10,661,509 B2
(45) Date of Patent: May 26, 2020

(54) FILM EDGE SEALING DEVICE

(71) Applicant: APRAC, LLC, Schiller Park, IL (US)

(72) Inventor: Raymond Uttaro, San Juan Capistrano, CA (US)

(73) Assignee: Arpac, LLC, Schiller Park, IL (US)

( * ) Notice: Subject to any disclaimer, the term of this patent is extended or adjusted under 35 U.S.C. 154(b) by 0 days.

(21) Appl. No.: 16/038,017

(22) Filed: Jul. 17, 2018

(65) Prior Publication Data
US 2019/0091941 A1 Mar. 28, 2019

Related U.S. Application Data

(60) Provisional application No. 62/562,279, filed on Sep. 22, 2017.

(51) Int. Cl.
*B29C 65/00* (2006.01)
*B29C 65/02* (2006.01)
(Continued)

(52) U.S. Cl.
CPC ............ *B29C 66/133* (2013.01); *B29C 65/02* (2013.01); *B29C 65/14* (2013.01); *B29C 65/18* (2013.01);
(Continued)

(58) Field of Classification Search
CPC ............ B29C 66/133; B29C 66/91231; B29C 65/7873; B29C 66/81431; B29C 66/8167; B29C 66/8412; B29C 66/0042; B29C 66/934; B29C 66/73921; B29C 66/43; B29C 65/7894; B29C 65/787; B29C 65/14; B29C 65/02; B29C 66/836; B29C 66/431; B29C 66/137; B29C 66/91933; B29C 66/849; B29C 66/91212; B29C 65/18; B29C 65/305; B29C 66/83411; B29C 66/4322; B29C 66/91943; B29C 66/9161; B29C 66/961; B29C 66/8222; B29C 66/8122; B29C 66/7352; B29C 66/8223; B29C 66/81423; B29C 66/83423;
(Continued)

(56) References Cited

U.S. PATENT DOCUMENTS 3,320,111 A * 5/1967 Lucia ................... B29C 65/749
156/515
3,633,333 A * 1/1972 Schlemmer ............. B29C 65/02
53/553
(Continued)

OTHER PUBLICATIONS

International Search Report and Written Opinion issued by ISA/EPO in connection with PCT/US2018/052016 dated Dec. 17, 2018.

*Primary Examiner* — Nathaniel C Chukwurah
*Assistant Examiner* — Mobeen Ahmed
(74) *Attorney, Agent, or Firm* — Levenfeld Pearlstein, LLC

(57) ABSTRACT

A film fin sealing device is disclosed herein which may have a groove defining a base. The base of the groove of the fin sealing device may be oriented at a skewed angle with respect to a longitudinal direction of the conveyor of a heat sealing machine. Edges of a thermoplastic sheet or two stacked layers of thermoplastic sheets are introduced into the groove of the film fin sealing device and placed in contact therewith to both heat and fuse the distal edge portions of the thermoplastic sheet(s) to join the edge portions thereof to form a fin seal.

16 Claims, 14 Drawing Sheets

(51) Int. Cl.
*B29C 41/12* (2006.01)
*B29C 65/78* (2006.01)
*B29C 65/30* (2006.01)
*B65B 51/26* (2006.01)
*B65B 51/18* (2006.01)
*B29C 65/18* (2006.01)
*B29C 65/14* (2006.01)
*B65B 11/50* (2006.01)
*B65B 41/12* (2006.01)
*B65B 51/16* (2006.01)
*B29L 31/00* (2006.01)
*B29K 701/12* (2006.01)

(52) U.S. Cl.
CPC .......... *B29C 65/305* (2013.01); *B29C 65/787* (2013.01); *B29C 65/7873* (2013.01); *B29C 65/7894* (2013.01); *B29C 66/0042* (2013.01); *B29C 66/137* (2013.01); *B29C 66/43* (2013.01); *B29C 66/431* (2013.01); *B29C 66/4322* (2013.01); *B29C 66/73921* (2013.01); *B29C 66/8167* (2013.01); *B29C 66/81431* (2013.01); *B29C 66/836* (2013.01); *B29C 66/83411* (2013.01); *B29C 66/849* (2013.01); *B29C 66/8412* (2013.01); *B29C 66/9161* (2013.01); *B29C 66/91212* (2013.01); *B29C 66/91231* (2013.01); *B29C 66/91933* (2013.01); *B29C 66/91943* (2013.01); *B29C 66/934* (2013.01); *B29C 66/961* (2013.01); *B65B 11/50* (2013.01); *B65B 41/12* (2013.01); *B65B 51/16* (2013.01); *B65B 51/18* (2013.01); *B65B 51/26* (2013.01); *B29C 66/7352* (2013.01); *B29C 66/8122* (2013.01); *B29C 66/81423* (2013.01); *B29C 66/8222* (2013.01); *B29C 66/8223* (2013.01); *B29C 66/83413* (2013.01); *B29C 66/83423* (2013.01); *B29K 2701/12* (2013.01); *B29L 2031/712* (2013.01); *B29L 2031/7128* (2013.01); *B65B 2220/08* (2013.01)

(58) Field of Classification Search
CPC ... B29C 66/83413; B65B 51/18; B65B 41/12; B65B 51/16; B65B 11/50; B65B 51/26; B65B 2220/08; B29K 2701/12; B29L 2031/7128; B29L 2031/712
See application file for complete search history.

(56) References Cited

U.S. PATENT DOCUMENTS

| | | | | |
|---|---|---|---|---|
| 4,219,988 | A * | 9/1980 | Shanklin | B29C 65/7433 53/373.5 |
| 5,149,393 | A * | 9/1992 | Hutchinson | B29C 65/229 156/555 |
| 5,165,221 | A * | 11/1992 | Udelson | B65B 9/06 493/302 |
| 5,341,623 | A * | 8/1994 | Siegel | B29C 66/81435 53/433 |
| 5,603,801 | A * | 2/1997 | DeFriese | B29C 65/7439 156/251 |
| 5,761,878 | A * | 6/1998 | Walkiewicz, Jr. | B29C 65/18 156/515 |
| 6,027,596 | A * | 2/2000 | DeFriese | B29C 65/7439 156/213 |
| 6,526,728 | B1 * | 3/2003 | Sorenson | B29C 65/229 53/373.5 |
| 8,651,162 | B2 * | 2/2014 | Christman | B29C 66/8161 156/553 |
| 8,726,960 | B1 * | 5/2014 | Huang | B29C 66/836 156/359 |
| 9,499,289 | B1 * | 11/2016 | Uttaro | B65B 51/306 |
| 2001/0013215 | A1 * | 8/2001 | Fuss | B29C 66/8122 53/403 |
| 2003/0217531 | A1 * | 11/2003 | Keen | B65B 9/207 53/552 |
| 2006/0107622 | A1 * | 5/2006 | James | B29C 65/7439 53/479 |
| 2007/0006973 | A1 * | 1/2007 | King, Jr. | B26D 1/0006 156/515 |
| 2013/0011510 | A1 * | 1/2013 | Chuba | B29C 66/0342 425/324.1 |
| 2013/0031870 | A1 * | 2/2013 | Christman | B29C 65/305 53/373.4 |
| 2013/0303353 | A1 * | 11/2013 | Orsini, III | B65B 51/26 493/189 |

* cited by examiner

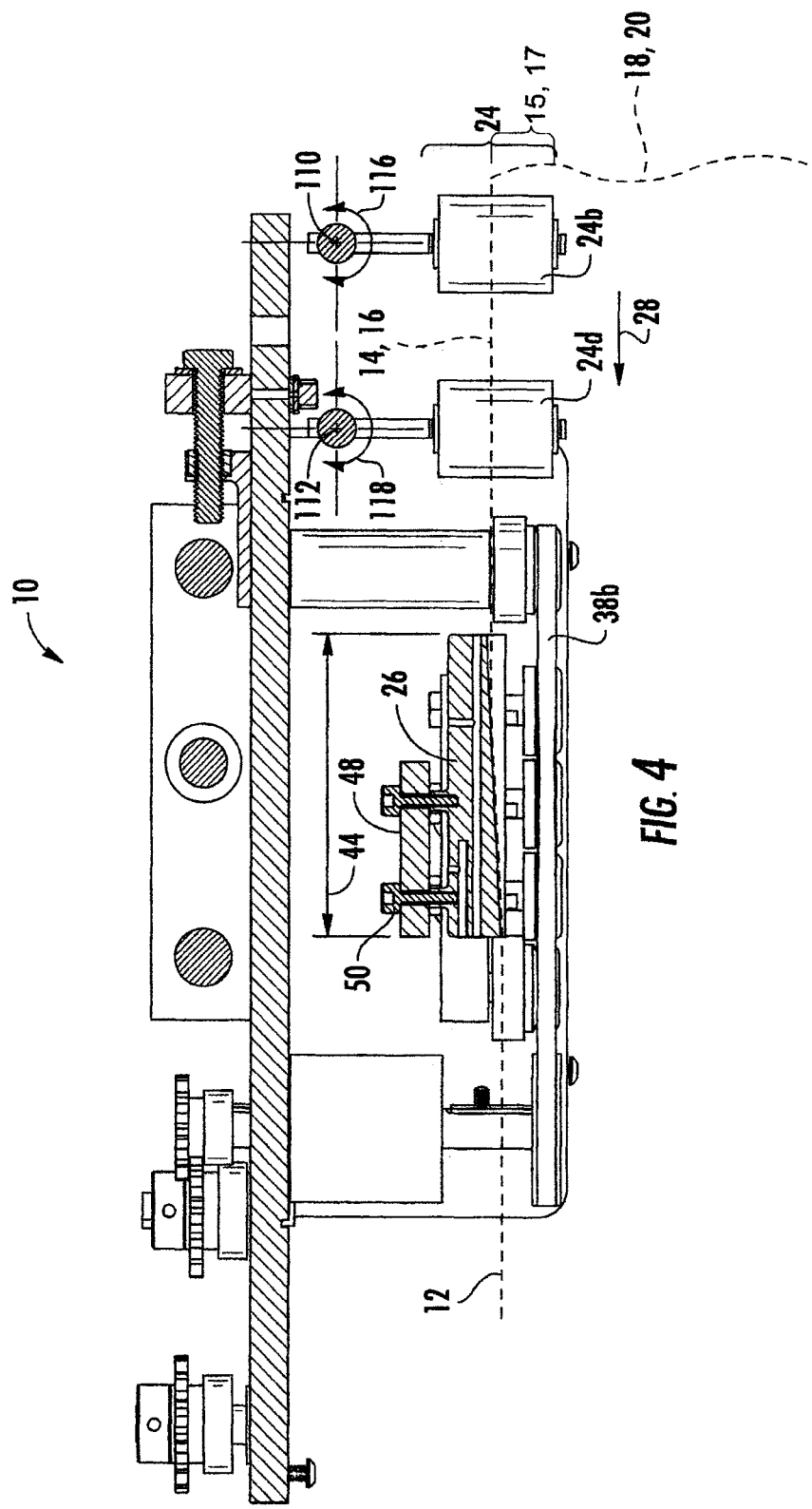

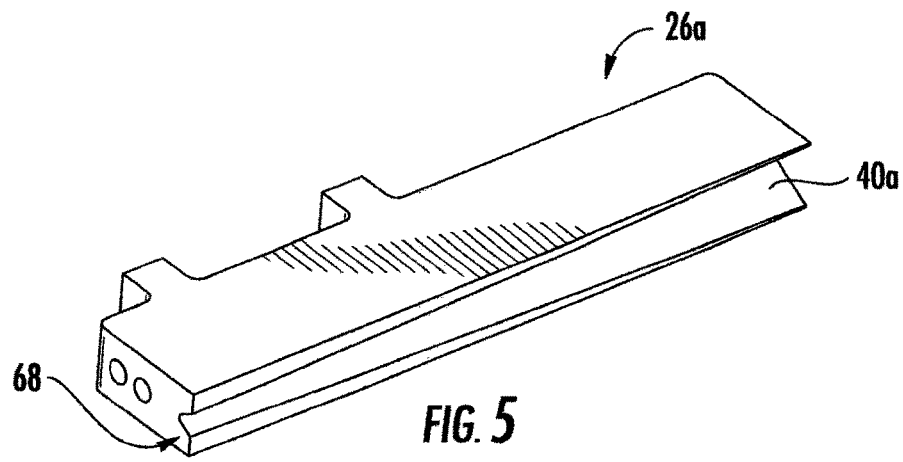
FIG. 5
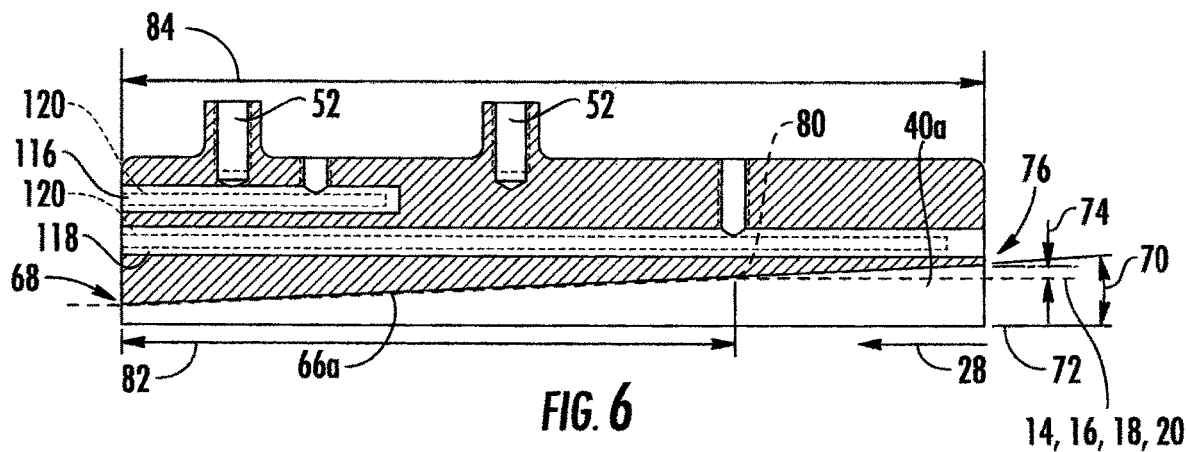
FIG. 6
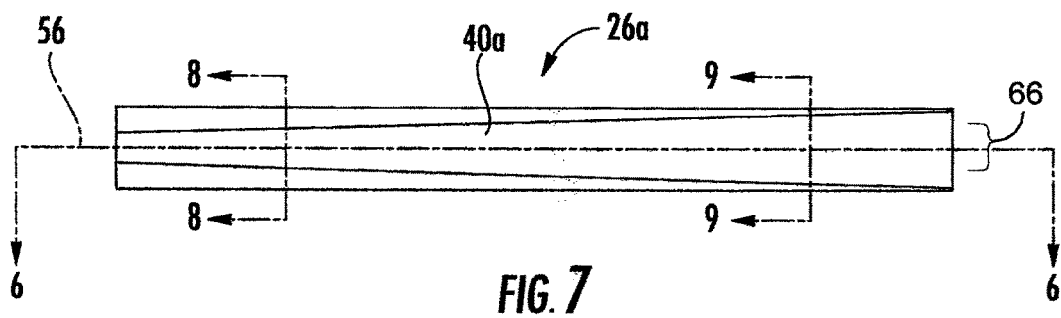
FIG. 7
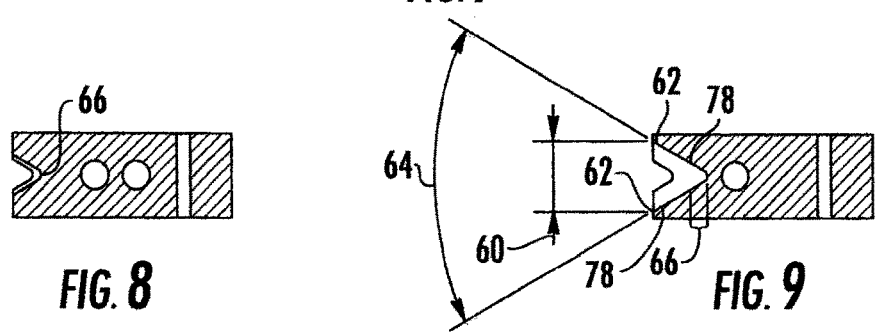
FIG. 8
FIG. 9

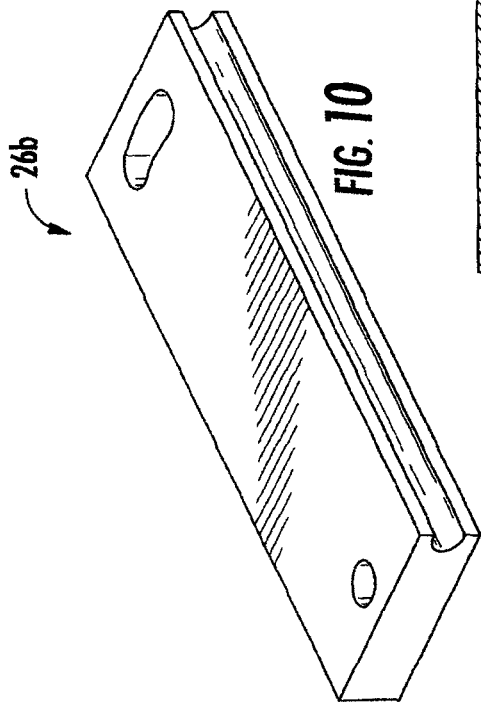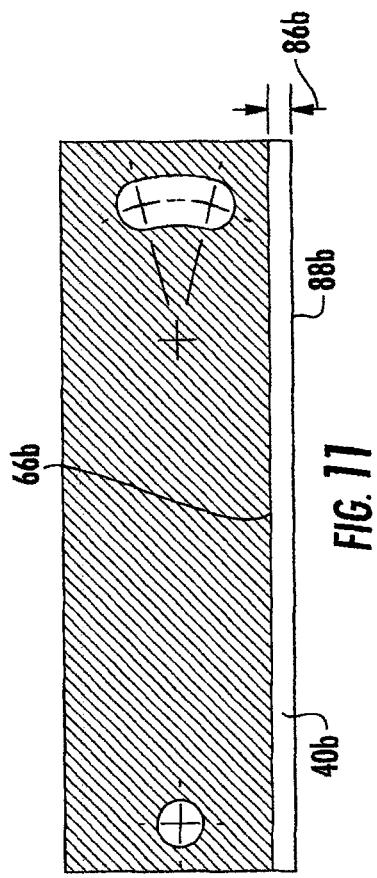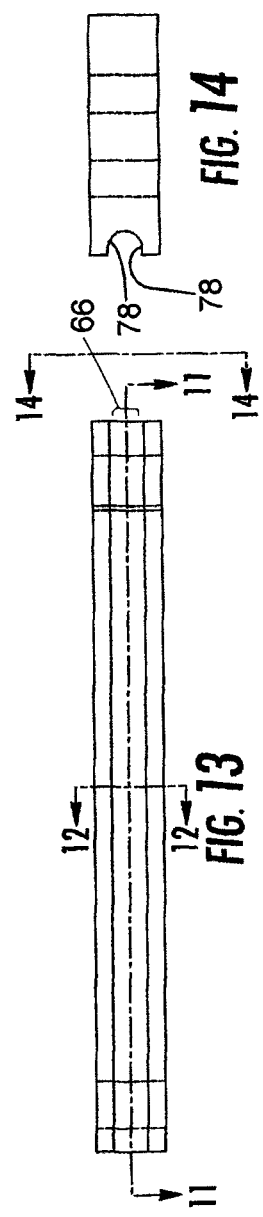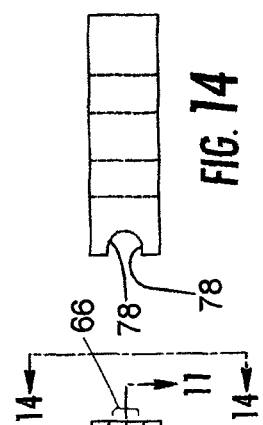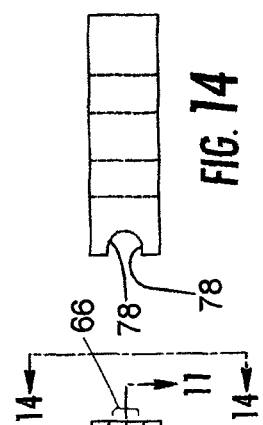

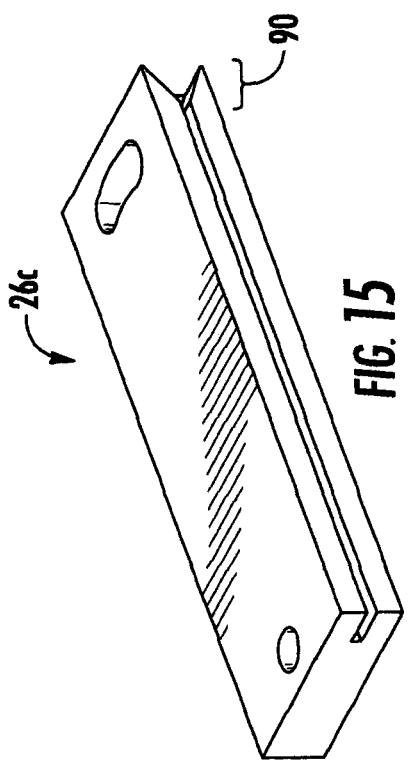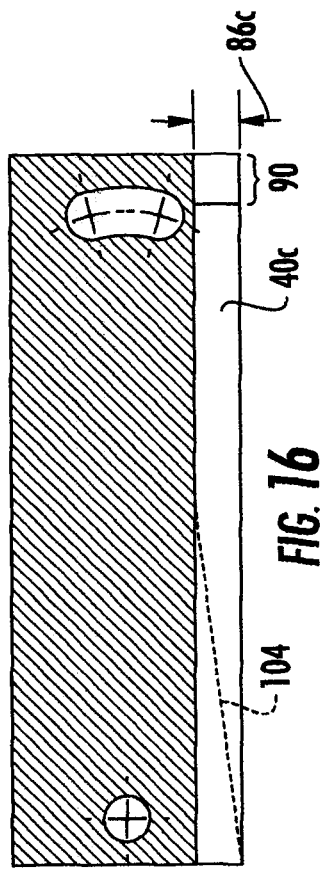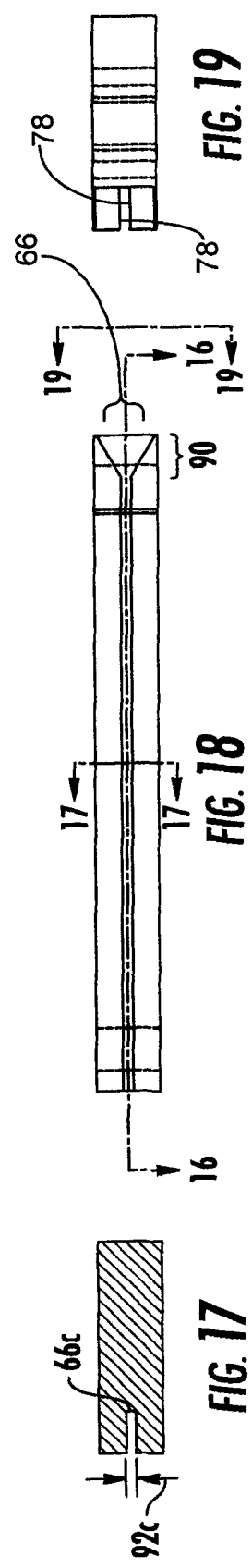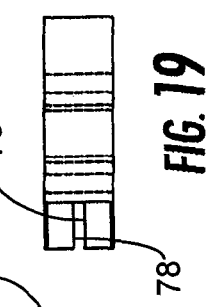

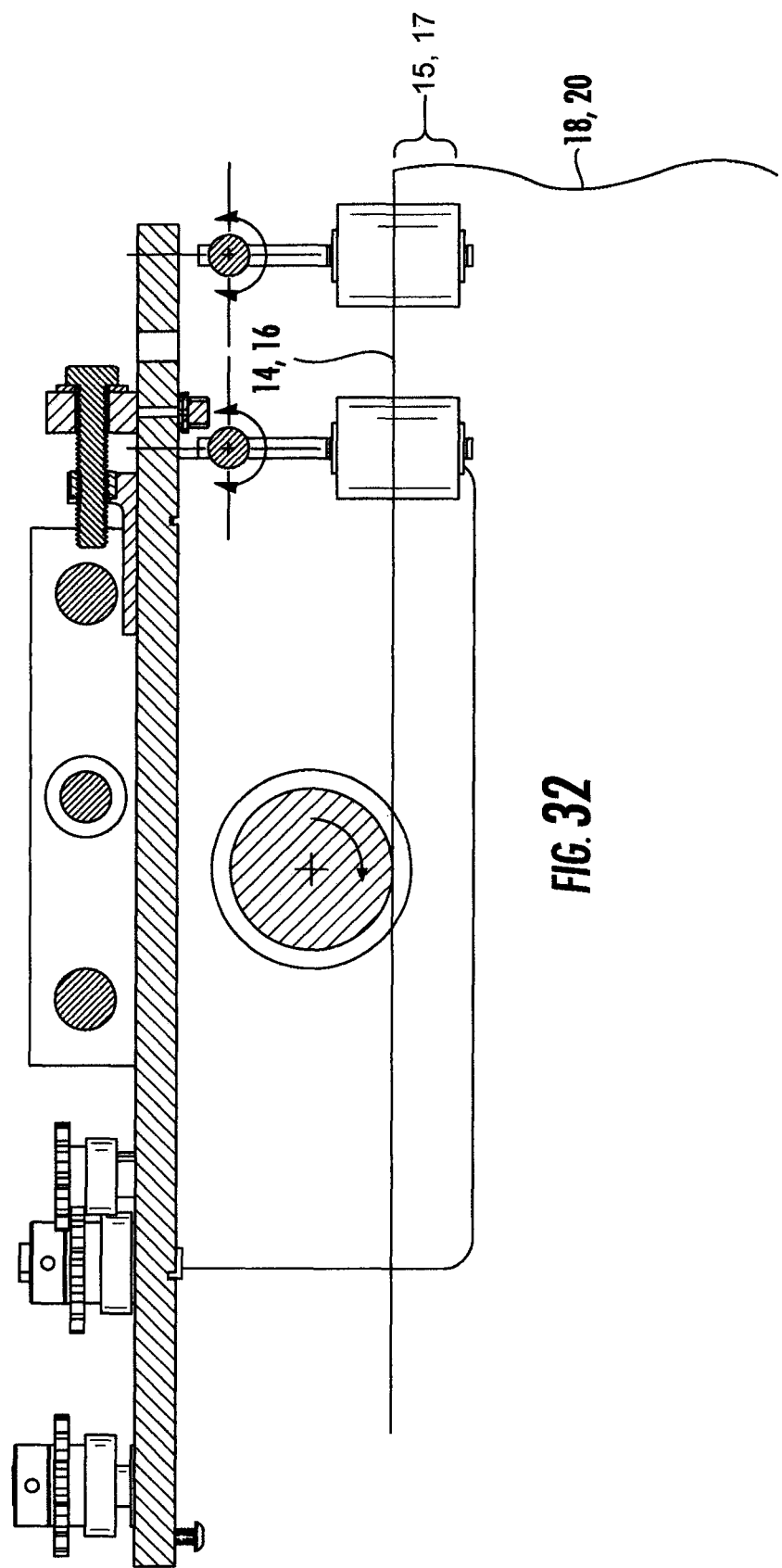

FILM EDGE SEALING DEVICE

CROSS-REFERENCE TO RELATED APPLICATIONS

This application relates to and claims the benefit of U.S. Provisional Application No. 62/562,279 filed on Sep. 22, 2017, the contents of which is expressly incorporated by reference herein.

STATEMENT RE: FEDERALLY SPONSORED RESEARCH/DEVELOPMENT

Not Applicable

BACKGROUND

The various embodiments and aspects described herein relate to a machine for wrapping and sealing a product within a thermoplastic film.

A prior art film fin sealing device is used to wrap a product within a thermoplastic sheet, join longitudinal edge portions of the thermoplastic sheet to form a fin seal as well as the leading and trailing sides to fully enclose the product in a bag. The product and the thermoplastic sheet may be passed through a heating oven in order to shrink the thermoplastic sheet to a tight fit around the product. Traditionally, the fin seal is very large in that the fin seal extends away from the product about ½ inch. To form a short fin seal, the large fin seal is slit to a shorter length. Alternatively, a longitudinal seal is formed at the edge portion with the loose edges at the very edge and the loose edges are slit to form a short fin seal. A significant portion of the longitudinal edge portion must be cut and discarded to form the short fin seal. The short fin seal is less noticeable and makes the shrink-wrapped product more aesthetically pleasing. Unfortunately, the subsequent slitting step wastes a significant amount of thermoplastic material.

Accordingly, there is a need in the art for an improved method and machine for reducing the amount of waste produced when shrink-wrapping the product with a short fin seal.

BRIEF SUMMARY

The various embodiments and aspects described herein address the needs discussed above, discussed below and those that are known in the art.

A fin seal heater block is provided which may be mounted to a frame of a heat sealing machine. The fin seal heater block may be disposed adjacent to a conveyor of the heat sealing machine and operative to create a short fin seal with the distal edge portions of a thermoplastic sheet(s) without the need for any subsequent slitting operation. The fin seal heater block may have a groove with a flat or curved base. The base may push the side edges of the thermoplastic sheet(s) together in order to melt and join small distal edge portions of the thermoplastic sheet in forming the short fin seal. Moreover, the fin seal heater block may be connected to a heating mechanism which raises the temperature of the fin seal heater block in order to melt and/or heat the edge portions of the thermoplastic sheet(s) to a transition temperature but below the melting temperature of the thermoplastic sheet(s).

When the edge portions of the thermoplastic sheet(s) enter the groove and come into contact with the base of the groove of the fin seal heater block, the edge portions of the thermoplastic sheet(s) begin to melt so that the edges of the thermoplastic sheet(s) become aligned to each other. That is, the edges of the thermoplastic sheet(s) may be misaligned when entering the groove but as the edges pass through the groove, the edges are melted so that they become aligned when they exit the groove. In particular, the edge that is closer to the base may melt sooner since the edge that is closer to the base contacts the base first, and thus the base of the fin seal heater block melts more of the edge that is closer to the base. As the edge portions of the thermoplastic sheet(s) traverse through the groove, the base which is skewed with respect to the travel direction of the thermoplastic sheet(s) eventually contacts the edge which was initially further away from the base. In this regard, the edge which was initially further away from the base is melted at a later time compared to the edge which was initially closer to the base. The two edges become aligned because the base of the fin seal heater block contacts the edge that was closer to the fin seal heater block and eventually melts the edge so that the edges are aligned.

The edge portions of the thermoplastic sheet(s), which are also hot, are now pressed together by pushing the edge portions of the thermoplastic sheet(s) against the base of the fin seal heater block. The edge portions are now joined together to form a short fin seal. The size of the short fin seal may be controlled by the amount of the distal portion of the thermoplastic sheet(s) that contact the base of the fin seal heater block as the distal portions of the thermoplastic sheet(s) proceeds through the fin seal heater block.

The fin seal formed with the machine and method described herein may melt and join about a distal 1/64" to about a distal 1" edge portion of the layers of the thermoplastic sheet(s) without any subsequent slitting operation. Preferably, the fin seal formed with the machine and method described herein may melt and join about a distal 1/32" to about a distal 3/32" edge portion of the layers of the thermoplastic sheet(s).

More particularly, a heat sealing machine for forming a fin seal on a folded thermoplastic sheet or two stacked layers of thermoplastic sheets when wrapping a product is disclosed. The heat sealing machine may comprise a stand for holding a roll of folded thermoplastic sheet or the two stacked layers of thermoplastic sheets, a heater mechanism, and a fin seal heater block attached to the heater mechanism for heating the fin seal heater block. The fin seal heater block may be disposed adjacent to edges of the thermoplastic sheet(s). The fin seal heater block may have a groove along a length of the fin seal heater block. A base of the groove may be oriented at a skew angle with respect to the edges of first and second layers of the thermoplastic sheet(s) so that the edges of the first and second layers of the thermoplastic sheet(s) approaches the base of the groove and contacts the base to seal distal edge portion of the first and second layers together to form the fin seal as the thermoplastic sheet(s) is fed through the heat sealing machine.

The machine may further comprise a conveyor adjacent to the stand for traversing the product towards a fin sealing mechanism. The product may be disposed between first and second layers of the folded thermoplastic sheet(s).

The skew angle of the groove base and the longitudinal direction of the conveyor may be between about negative 3 degrees to about 20 degrees. Preferably, the skew angle is between about zero degrees to about 2 degrees to allow the edges of the first and second layers to maximize contact with the base of the groove to melt and fuse the edge portions of the first and second layers together.

The groove may define a slot angle between 180 degrees and zero degrees. An exterior surface of the groove may have an anti-friction coating or properties and/or anti-stick coating or properties.

A length of the base of the groove of the fin seal heater block may be between about 1 inch and about 20 inches. A width of the groove may be between about 3 inches and 0.03 inches. The base of the fin seal heater block may be straight or curved.

The fin seal heater block may reach a temperature sufficient to melt the thermoplastic sheet. For example, the temperature of the fin seal heater block may reach a temperature about 100 degrees Fahrenheit to about 750 degrees Fahrenheit.

In another aspect, a fin seal heater block mountable to a heat sealing machine is disclosed. The fin seal heater block may comprise a body disposed adjacent to a thermoplastic sheet(s) and upper and lower guides.

The body may have a base oriented at a skew angle with respect to a longitudinal direction of the thermoplastic sheet(s) so that edges of the first and second layers of a folded thermoplastic sheet or two stacked layers of thermoplastic sheets directly contact the base of the body as the edges of the first and second layers of the thermoplastic sheet(s) are fed through the heat sealing machine and the body is adapted to be connected to a heat source to conduct heat from the heat source to the base of the body to heat and seal the edge portions of the first and second layers of the thermoplastic sheet(s) together to form a fin seal.

The upper and lower guides may be adjacent to the base of the fin seal heater block to maintain the edge portions of the first and second layers of the thermoplastic sheet(s) on the base as the thermoplastic sheet(s) is fed through the heat sealing machine wherein the upper and lower guides and the base define a groove.

The fin seal heater block may further comprising a conveyor. The skew angle of the base and the longitudinal direction of the conveyor may be between about negative 3 degrees to about 20 degrees. Preferably, the skew angle may be between about zero degrees to about 2 degrees to allow the edges of the first and second layers to maximize contact with the base of the groove to melt and fuse the edges of the first and second layers together.

A base of the groove may have a maximum width of 2 inches.

The block may be pivotable with respect to a mounting block to adjust the skew angle of the base of the groove of the body.

The base of the groove may have a rounded cross sectional configuration, a pointed cross sectional configuration, a truncated cross sectional configuration or a flat bottom.

The groove and the body may be circular.

In another aspect, a heat sealing machine for forming a fin seal of a folded thermoplastic sheet or two stacked layers of thermoplastic sheets when wrapping a product is disclosed. The machine may comprise a stand for holding a roll of folded thermoplastic sheet or the two stacked layers of thermoplastic sheets, a heater mechanism, a fin seal heater block attached to the heater mechanism for heating the fin seal heater block, upper and lower guides and a set of pinch rollers or belts.

The fin seal heater block may be disposed adjacent to edges of the thermoplastic sheet(s). The fin seal heater block may have a base oriented at a skew angle with respect to the edges of first and second layers of the thermoplastic sheet(s) so that the edge portions of the first and second layers of the thermoplastic sheet(s) approaches the base and contacts the base to heat and seal the first and second edge portions together to form the fin seal as the thermoplastic sheet(s) is fed through the heat sealing machine.

The upper and lower guides may be adjacent to the base of the fin seal heater block to maintain the edge portions of the first and second layers of the thermoplastic sheet(s) on the base as the thermoplastic sheet(s) is fed through the heat sealing machine. The upper and lower guides may be integral with the edge sealer block. The upper and lower guides and the base may define a groove through which the thermoplastic sheet(s) are fed to seal the first and second edge portions of the thermoplastic sheet(s).

The set of pinch rollers or belts may be disposed adjacent to the fin seal heater block for controlling forward travel of the edges of the first and second layers of the thermoplastic sheet(s) as the edge portions of the first and second layers of the thermoplastic sheet(s) are fed against the base of the fin seal heater block. The set of pinch rollers or belts may comprise first and second of pinch rollers positioned upstream of the fin seal heater block and one set of pinch belts laterally adjacent to the fin seal heater block.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4 is a cross-sectional top view of the film fin sealing device shown in FIG. 3;

FIG. 5 is a perspective view of a first embodiment of a fin seal heater block utilized in the film fin sealing device;

FIG. 6 is a cross-sectional top view of the fin seal heater block shown in FIG. 5;

FIG. 7 is a front view of the fin seal heater block shown in FIG. 5;

FIG. 8 is a transverse cross-sectional view of the fin seal heater block shown in FIG. 7;

FIG. 9 is a different transverse cross-sectional view of the fin seal heater block shown in FIG. 7;

FIG. 10 is a perspective view of a second embodiment of the fin seal heater block utilized in the film fin sealing device;

FIG. 11 is a top cross-sectional view of the fin seal heater block shown in FIG. 10;

FIG. 12 is a cross-sectional view of the fin seal heater block shown in FIG. 10;

FIG. 13 is a front view of the fin seal heater block shown in FIG. 10;

FIG. 14 is a different cross-sectional view of the fin seal heater block shown in FIG. 10;

FIG. 15 is a perspective view of a third embodiment of the fin seal heater block utilized in the film fin sealing device;

FIG. 16 is a top cross-sectional view of the fin seal heater block shown in FIG. 15;

FIG. 17 is a cross-sectional view of the fin seal heater block shown in FIG. 15;

FIG. 18 is a front view of the fin seal heater block shown in FIG. 15;

FIG. 19 is a different cross-sectional view of the fin seal heater block shown in FIG. 15;

FIG. 32 illustrates a top view of the rotating fin seal heater block of FIG. 31.

DETAILED DESCRIPTION

Figure 1:
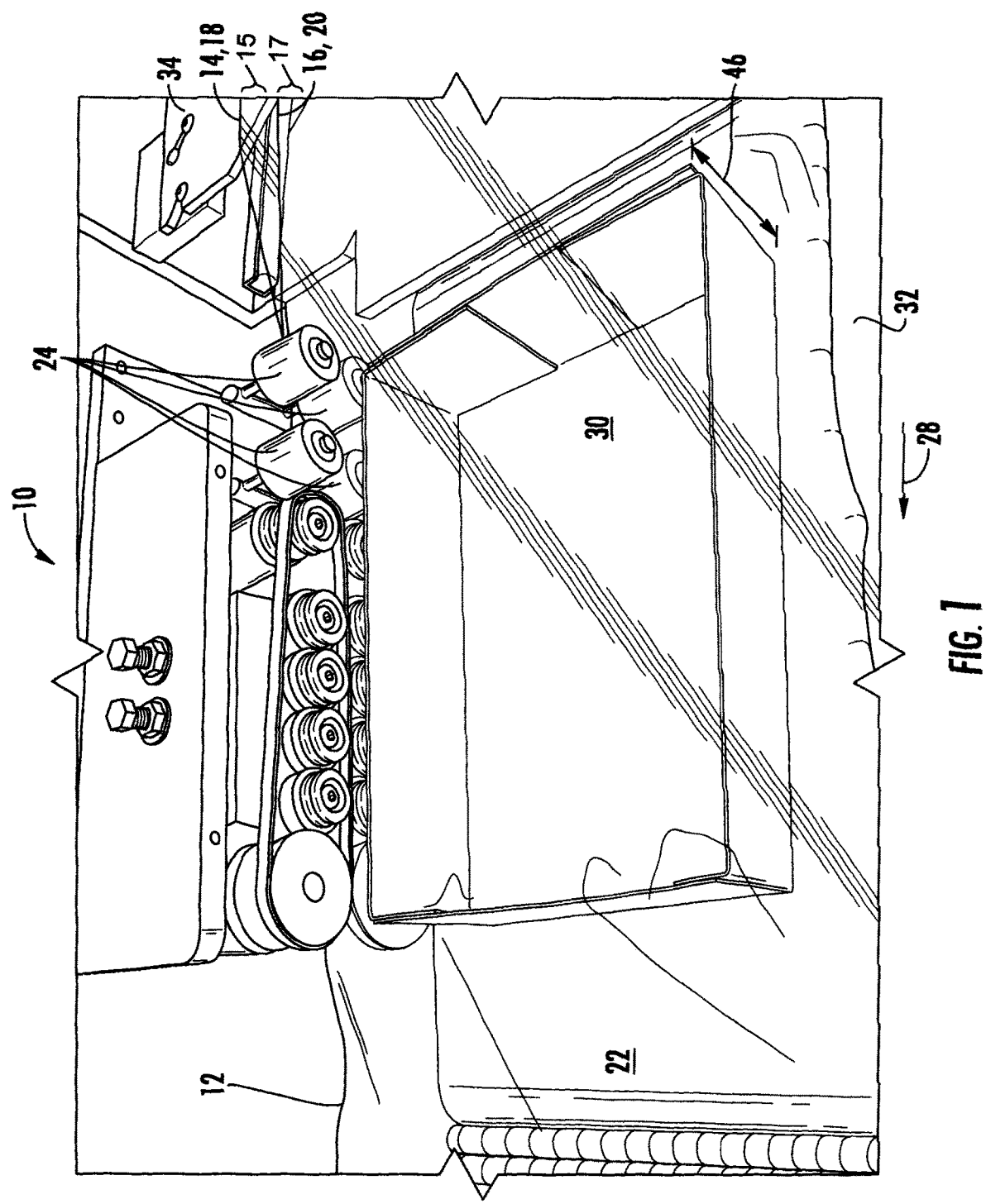
FIG. 1 is a perspective view of a heat sealing machine with a film fin sealing device.

Referring now to the drawings, a heat sealing machine 10 for forming a short fin seal 12 that joins the first and second distal edge portions 15, 17 of first and second layers 18, 20 of a thermoplastic sheet(s) 22 is shown. Distal edge portions 15, 17 of the thermoplastic sheet(s) may be melted or its temperature raised to or above a transition temperature of the thermoplastic sheet(s). By way of example and not limitation, a distal 1/64" to 1" (preferably between about a distal 1/32" to about a distal 1/16") of the longitudinal edges of the first and second layers of the thermoplastic sheet(s) may be melted or heated to a temperature above its transition temperature to form the short fin seal. The heat sealing machine 10 may have a set of rollers 24 that grip the first and second layers 18, 20 of the thermoplastic sheet(s) 22 to guide the first and second edge portions 15, 17 of the first and second layers 18, 20 of the thermoplastic sheet(s) 22 closer to a base of the fin seal heater block 26 (see FIGS. 4-28) which is heated to a melting temperature or at least a transition temperature of the thermoplastic sheet(s) 22 in order to melt or at least raise the temperature of the edge portions 15, 17 of the thermoplastic sheet(s) to its transition temperature. When the edge portions 15, 17 of the thermoplastic sheet(s) are initially brought close to the fin seal heater block 26 or when the edge portions 15, 17 of the thermoplastic sheet(s) are initially placed into contact with the fin seal heater block 26, the fin seal heater block 26 may melt or heat the edge portions 15, 17 of the thermoplastic sheet(s). The distal edge portions 15, 17 are pushed against the base of the fin seal heater block 26 to join the distal edge portions 15, 17 and form the short fin seal.

Figure 4A:
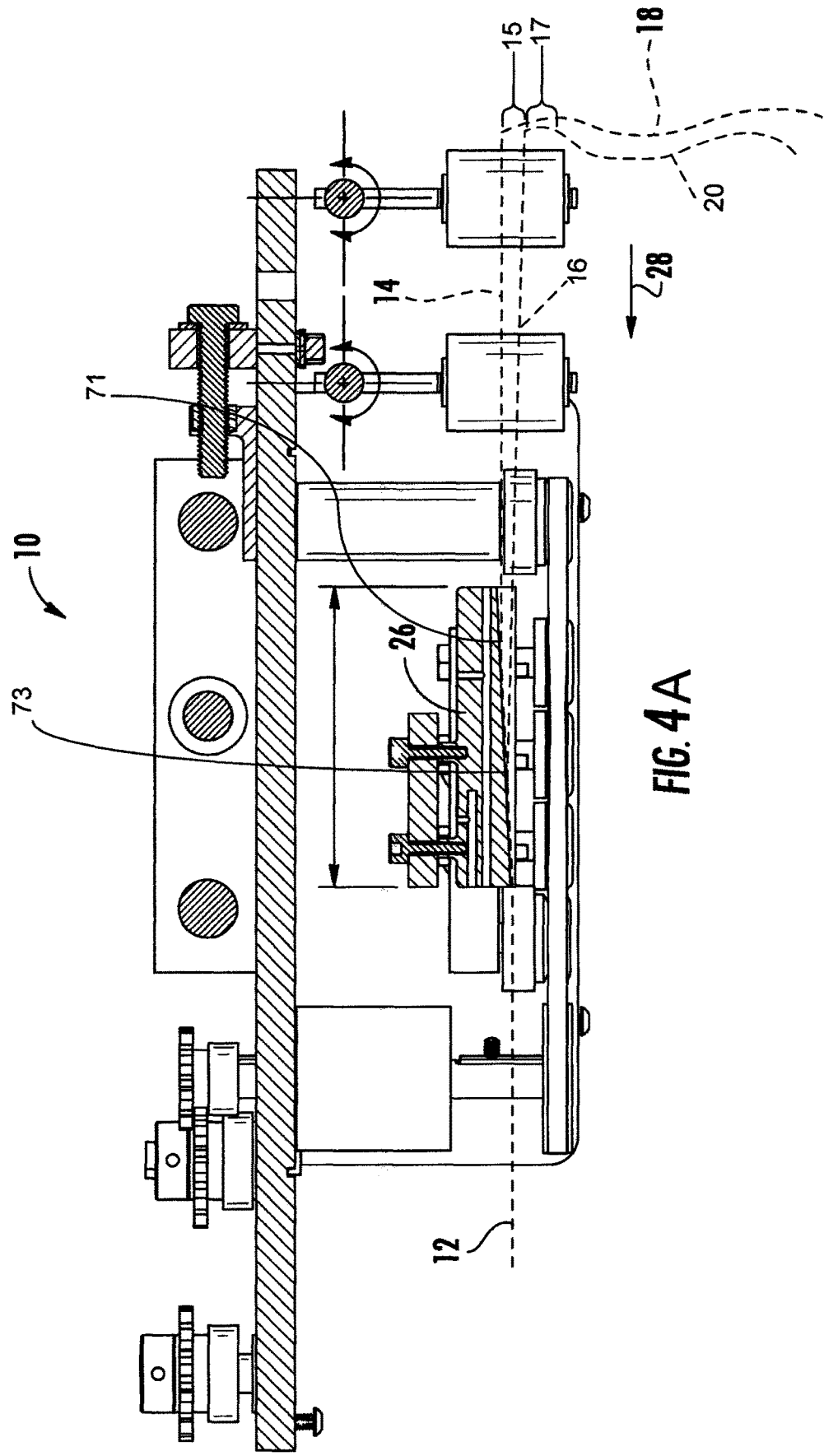
FIG. 4A illustrates a cross-sectional top view of the film fin sealing device shown in FIG. 4 with edges of the thermoplastic sheet misaligned to each other.

The edges 14, 16 of the edge portions 15, 17 of the thermoplastic sheet(s) may be misaligned when the edges 14, 16 enter the fin sealer heater block 26, as shown in FIG. 4A. In this instance, the edge 14 of the edge portion 15 of the thermoplastic sheet(s) that is closer to the base of the fin seal heater block 26 may melt more than the edge 16 of the edge portion 17 of the thermoplastic sheet(s) that is further away from the base of the fin seal heater block. In this manner, the misaligned edges 14, 16 of the edge portions 15, 17 of the thermoplastic sheet(s) are melted and become aligned to each other as the edge portions 15, 17 of the thermoplastic sheet(s) are traversed past the fin seal heater block. The edge portions 15, 17 of the thermoplastic sheet(s) are also placed in contact with the fin seal heater block 26 and pressure is applied to both of the edge portions 15, 17. The edge portions 15, 17 maintain contact with the fin seal heater block 26 for a sufficient amount of time in order to fuse the edge portions 15, 17 of the thermoplastic sheet(s) together and form the short fin seal.

The fin seal heater block 26 may be oriented so that a groove of the fin seal heater block 26 has a skewed angle 70, as shown in FIG. 6. In this regard, the fin seal heater block 26 places an increasing force against the edge portions 15, 17 as the edge portions 15, 17 proceed through the groove or past the fin seal heater block 26. The pressure from this force, the heat from the fin seal heater block 26 and the time it takes for the edge portions 15, 17 to proceed through the groove or past the fin seal heater block creates the fin seal. Because only a short portion of the edge portions 15, 17 is heated and only that short portion are fused together, the fins seal is short.

Directional arrow 28 shows the direction of the thermoplastic sheet(s) 22 as it proceeds through the heat sealing machine 10. The fin seal heater block 26 may be adjacent to the product 28 being wrapped and the longitudinal edges of the thermoplastic sheet(s). By way of example and not limitation, the fin seal heater block 26 is shown as being oriented on a lateral side in FIG. 1 to the product 28 being wrapped. However, other orientations are also contemplated such as top (see FIG. 30), opposed lateral side and bottom with respect to the product being wrapped.

The term fin seal may be defined as edge portions 15, 17 of the thermoplastic sheet(s) fused to each other. The fused portions of the thermoplastic sheet(s) may be curled. However, when the fused portions of the thermoplastic sheet(s) are cut, a cross-section of the seal may show that the fused portions are defined by flat edge portions 15, 17 of the thermoplastic sheet(s) that are fused together. The flat portions may be curled but nonetheless form a short fin seal.

The thermoplastic sheet(s) 22 used in the heat sealing machine 10 may have a thickness of about 0.0001 to about 0.03 inches. The various aspects and features described herein in relation to the heat sealing machine 10, and more particularly to the fin seal heater block 26 are described in relation to the thermoplastic sheet(s) fabricated from SEALED AIR manufacturer and sold under the product name CRYOVAC. Although the thermoplastic sheet(s) 22 has been described as having a thickness of about 0.0003 inches, it is also contemplated that the thermoplastic sheet(s) 22 may be as thick as 0.03 inches or as thin as 0.0001 inches.

The first and second edge portions 15, 17 of the first and second layers 18, 20 may be fused together to form the fin seal 12 with the existence of time, temperature and pressure. In the example provided herein, only the short distal edge portions 15, 17 of the first and second layers of the thermoplastic sheet(s) is fused to form the fin seal. No subsequent slitting operation is needed after the fin seal is formed thereby reducing waste of the thermoplastic sheet(s). Even if no subsequent slitting operation is necessary, it is still contemplated that a subsequent slitting operation may be performed on the short fin seal in order to produce an even shorter fin seal.

A short fin seal is attractive since a large fin seal would hang out and distract from the aesthetics of the wrapped product. The short fin seal may preferably have a width of about 1/32 of an inch to about 1/8 of an inch. Moreover, the fin seal may curl upon itself so that the short fin seal is even less noticeable and may appear to be sealing the very edges of the thermoplastic sheet(s). The fin seal heater block 26 may contact the first and second edge portions 15, 17 for a sufficient period of time so that heat can be transferred to the first and second edge portions 15, 17 and raise the temperature of the first and second edge portions 15, 17 to at least the transition temperature of the thermoplastic sheet(s) to fuse the edge portions 15, 17 and form the fin seal. In this regard, the fin seal heater block 26 may be heated to at least a transition temperature of the thermoplastic sheet(s) 22. Preferably, the fin seal heater block 26 may be heated to at least 150° F. which may be about 50° F. above the melting temperature of the thermoplastic sheet(s) 22. Moreover, the fin seal heater block 26 may be configured (e.g., angled slot or groove) so as to apply pressure against the heated edge portions 15, 17 to fuse the same 15, 17 together to form the fin seal. The two edge portions 15, 17 must be forced together to apply pressure to the edge portions 15, 17 and form the fin seal 12. No slitter need be used to cut off an excess amount of the fin seal 12 although one may be used to form an even shorter fin seal.

Referring now to FIG. 1, the heat sealing machine 10 may have a conveyor 32 that transports the product 30 in the direction of directional arrow 28. A thermoplastic sheet 22 may be provided in a rolled and folded form. Alternatively, two stacked layers of thermoplastic sheets may be provided in rolled form. In this instance, both distal portions 15, 17 of opposed sides of the two stacked layers of the sheets may be heat sealed with two fin seal heater blocks positioned on the opposed sides of the two stacked layers of sheets. The heat sealing machine 10 may have a separator 34 that separates the folded thermoplastic sheet(s) 22 to provide a gap between the first and second layers 18, 20 of the folded thermoplastic sheet(s) 22. The product 30 may be slipped between the first and second layers 18, 20. In FIG. 1, the product 30 is shown as being sandwiched between the first and second layers 18, 20 of the thermoplastic sheet(s) 22.

The heat sealing machine 10 may have a set of pinch rollers 24 that grips the first and second layers 18, 20 of the thermoplastic sheet(s) 22 and drives the first and second layers 18, 20 of the thermoplastic sheet(s) 22 at the same rate of forward travel as a conveyor 32.

Figure 2:
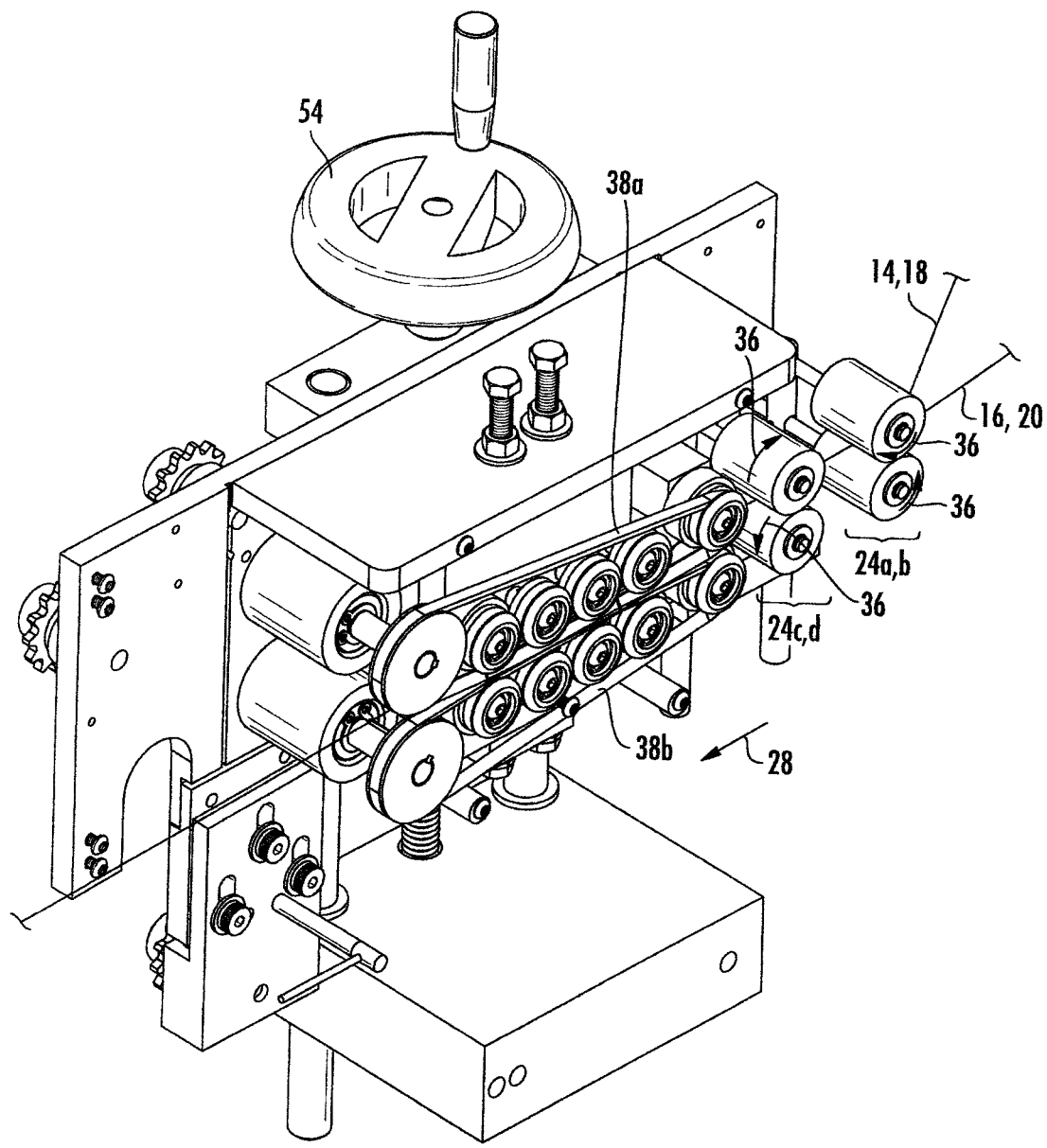
FIG. 2 is a perspective view of the film fin sealing device.

The rollers 24 include first and second sets of rollers 24a, b and 24c, d. The first and second sets of rollers 24a, b and 24c, d may rotate in the direction of arrow 36 (see FIG. 2) in order to drive the thermoplastic sheet(s) 22 in the direction of arrow 28. The rollers 24a, b and 24c, d may be fabricated from an elastomeric material in order to provide a high coefficient of friction so that the rollers 24a, b provide a positive grip on the first and second layers 18, 20 of thermoplastic sheet(s) 22. The first set of rollers 24a, b may be supplemented with a second set of rollers 24a, d which is identical to the first set of the rollers 24a, b except that it is positioned downstream from the first set of rollers 24a, b. The rollers 24a-d may be timed so that the edges 14, 16 and edge portions 15, 17 of the first and second layers 18, 20 of the thermoplastic sheet(s) 22 travel at the same forward directional rate as the conveyor 32 of the heat sealing machine 10.

Figure 3:
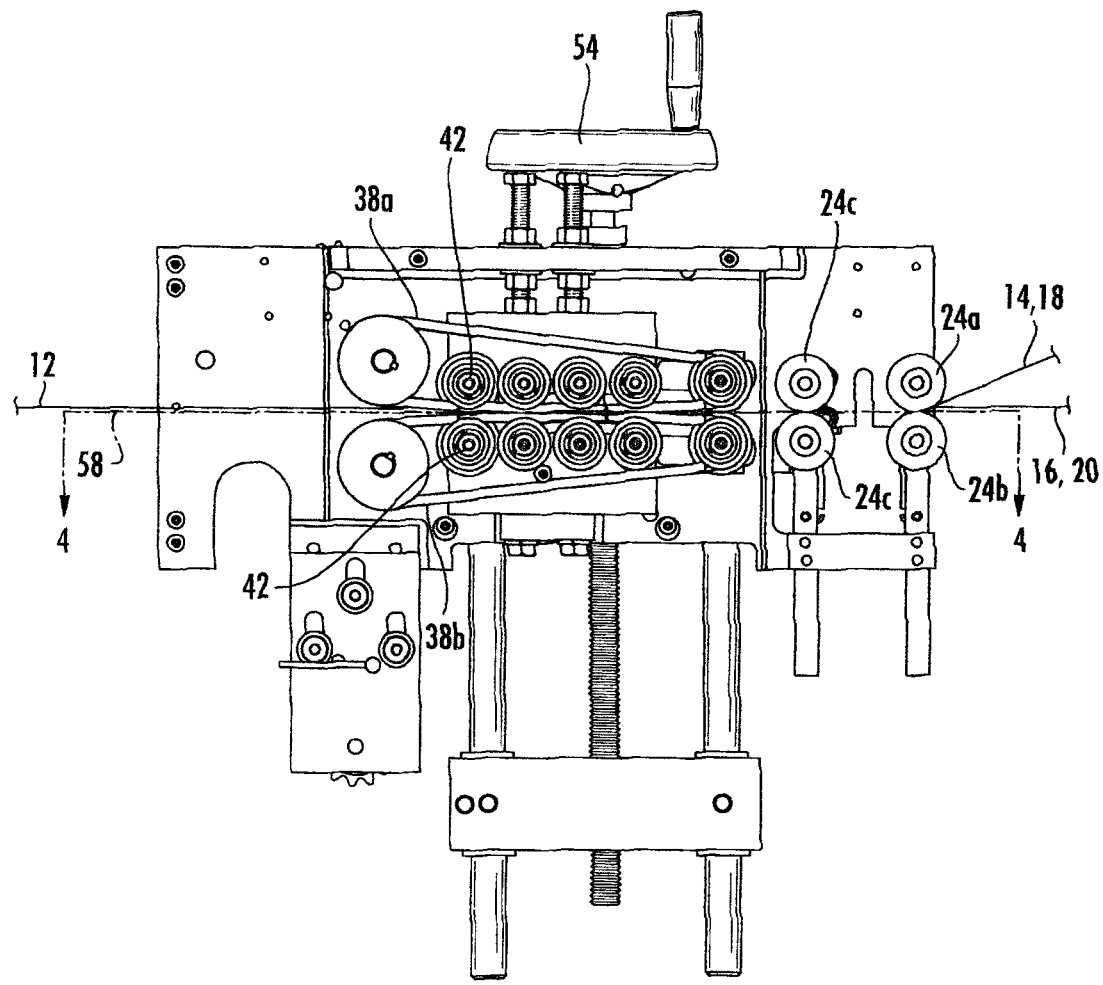
FIG. 3 is a front view of the film fin sealing device shown in FIG. 2.

Downstream of the first and second sets of controllers 24a, b, 24c, d, a set of pinch belts 38a, b may guide the first and second layers 18, 20 of thermoplastic sheet(s) 22 across the fin seal heater block 26. Referring to FIGS. 4 and 4A, the first and second edges 14, 16 of the first and second layers 18, 20 of the thermoplastic sheet(s) 22 may be guided to a middle portion along the axial length of the rollers 24a, b, and 24c, d. The edges 14, 16 may be aligned as shown in FIG. 4 or misaligned as shown in FIG. 4A. The position of the edges 14, 16 may be maintained as the first and second layers 18, 20 of the thermoplastic sheet(s) 22 are being fed into a groove of the fin seal heater block 26. The pinch belts 38a, b do not grip the first and second edges 14, 16 but is offset inward from the edges 14, 16, as shown in FIGS. 4 and 4A. Preferably, the pinch belts 38a, b are sufficiently close to the edges 14, 16 in order to control the edges 14, 16 as the edges 14, 16 are inserted into a groove 40a (see FIG. 5) of the fin seal heater block 26a. Preferably, the rigidity of the sheet(s) 22 and the short distance of the pinch belt 38a, b from the edges 14, 16 are sufficient to control the edges 14, 16 as they pass in the groove 40a of the fin seal heater block 26a. The pinch belts 38a, b pinch the first and second layers 18, 20 of the thermoplastic sheet(s) 22 together by a set of rollers 42 (see FIG. 3). The set of rollers 42 is preferably stacked closely adjacent to the next. The rollers 42 are disposed one after the other and preferably extend along a length 44 of the fin seal heater block 26. The upper rollers 42 are vertically aligned to the lower rollers 42. The vertical elevation of the pinch belt 38a, b and the rollers 24a-d are equal to each other so that the edges 14, 16 of the first and second layers 18, 20 of the thermoplastic sheet(s) 22 run parallel with the conveyor 32. Moreover, the vertical position of the pinch belts 38a, b and rollers 24a-d may be adjusted via handle 54 in order to account for a height 46 of the product 30. Preferably, the vertical position of the rollers 24a-d and pinch belts 38a, b are disposed at a midpoint of the height 46 of the product 30.

In FIG. 4, the edges 14, 16 of the layers 18, 20 of the thermoplastic sheet(s) are shown as being aligned to each other. In other words, the edges 14, 16 are at the same distance away from a base of the fin seal heater block 26. However, when running the heat sealing machine 10, the edges 14, 16 may be misaligned as shown in FIG. 4A. One of the edges 14, 16 may be closer to the fin seal heater block 26 compared to the other one of the edges 14, 16. As discussed below in relation to FIG. 6, a heater element 120 is inserted into the fin seal heater block 26. The heater element 120 is preferably disposed or located behind the groove 40, and more particularly a base 66 of the groove 40. The base 66 of the groove 40 may be the hottest part of the fin seal heater block 26 and closest to the edges 14, 16 of the layers 18, 20 of the thermoplastic sheet(s) 22. Referring back to FIG. 4A, the edge 14 of the layer 18 that is closer to the base 66 of the groove 40 melts first because the closer edge 14 contacts the base of the fin seal heater block first due to the skew angle 70 (see FIG. 6) of the base of the fin seal heater block 26. Edge 14 contacts the base 66 of the groove at point 71 (see FIG. 4A). The edge 16 of the layer 20 that is further away from the base 66 of the groove 40 melts at a later time when the further edge 16 contacts the base of the fin seal heater block. Edge contacts the base 66 at point 73 (see FIG. 4A). Eventually, the edges 14, 16 melt and become aligned to each other as shown in FIG. 4A as they exit the groove. Also, the edge portions are fused together to form the short fin seal as the edge portions 15, 17 are pushed against the base of the fin seal heater block.

The fin seal heater block 26a may be attached to a frame 48 of the heat sealing machine 10 with bolts 50. The fin seal heater block 26a may have two threaded holes 52 which engage the threads of the bolts 50. Once the fin seal heater block 26a is attached to the frame 48, the frame and the rollers 24 and pinch belt 38 move as a unit vertically by rotating handle 54. The lateral relationship between the fin seal heater block 26 and the edges 14, 16 of the first and second layers 18, 20 of the thermoplastic sheet(s) 22 may be controlled by controlling the position of the edges 14, 16. Alternatively, it is also contemplated that the frame 48, fin seal heater block 26a, rollers 24 and pinch belts 38 may latterly move as a unit by way of a screw or other gearing mechanism. When the fin seal heater block 26a is mounted to the frame 48, the centerline 56 (see FIG. 7) of the groove 40 of the fin seal heater block 26 may be aligned to the centerline 58 (see FIG. 3) of the pinch belts 38a, b.

Referring now to FIG. 6, the fin seal heater block 26a is shown as having two recesses 116, 118. Recess 118 may receive a heater element 120. The heater element 120 may be raised to an elevated temperature and transfers heat to the fin seal heater block 26a. The other embodiments of the fin seal heater block 26 may also receive the heater 120 in the same manner. Recess 116 may receive a thermocouple which may send signals to a temperature control microprocessor. The temperature control microprocessor sends electrical current to regulate the amount of heat generated by the heater thereby forming a closed loop temperature control.

Referring now to FIGS. 5-9, a first embodiment of the fin seal heater block 26a is shown. The fin seal heater block 26a may have a groove 40a that runs longitudinally along the length of the fin seal heater block 26a. The groove 40a is sufficiently wide 60 in that upper edges 62 of the groove 40a are spread apart to guide and maintain the first and second layers 18, 20 in the groove 40a. The groove 40a may be an angled slot having an angle 64 of about 180° to about zero degrees. Preferably, the angle 64 is between 160° and 0°. When the groove 40a has an angle 64 less than 180°, the base 66 of the groove 40a may have a rounded bottom as shown in FIGS. 7 and 8. When the edges 14, 16 of the first and second layers 18, 20 of the sheet(s) 22 are urged toward the base 66, the edges 14, 16 may be pushed to be in physical contact with fin seal heater block 26 and pushed together in order to apply pressure or force the edge portions 15, 17 in contact with each other. The edge portions 15, 17 begin to form a fin seal when the edge portions 15, 17 are melted under heat from the fin seal heater block 26a and fused together. This minimizes waste since only the distal portions 15, 17 (by way of example and not limitation, distal 1/64" to 1" portion of the edges, and more preferably about a distal 1/32" to about a distal 3/32" portion) are melted and joined to each other to form the short fin seal. When the edge portions 15, 17 exit out of the exit 68 of the fin seal heater block 26a, the edge portions 15, 17 are fused together in the form of the short fin seal. This improves the aesthetics of the wrapper since there is no excess or large fin seal hanging off of the wrapper.

Referring now to FIG. 6, the base 66a of the groove 40a is shown at a skewed angle 70. The skewed angle 70 of the base 66a may be between 10 degrees to about negative 3 degrees, and more preferably between zero and 2 degrees. The most preferred skewed angle 70 is about 1 degree. The baseline 72 refers to a direction of travel of the edges 14, 16 when the layers 18, 20 of the sheet(s) 22 are passed through the fin seal heater block 26. In this regard, the direction of travel 28 is referenced as being horizontal and proceeds right to left across the page. The direction of travel 28 and the baseline 72 are parallel with each other. The direction of travel 28 and the baseline 72 may also be parallel with the edges 14, 16 of the upper and lower layers 18, 20 of the sheet 22. As such, the skew angle 70 of the base 66a may be with respect to the direction of travel 28, the baseline 72 or the edges of the layers 18, 20.

The distance 74 from the edges 14, 16 of the first and second layers 18, 20 of the sheet(s) 22 to the base 66 at its entrance 76 may be about 0.375 inches to about 0.060 inches and is preferably adjusted to about 0.125 inches. The distance 74 between the entrance 76 at the base 66a of the fin seal heater block 26a and the edges 14, 16 is a minimum distance in order to prevent the edges 14, 16 from rubbing against the entrance 76 of the groove 40a.

It is also contemplated that the base 66 of the entrance 76 may be rounded so that if the edges 14, 16 do rub into or contact a sharp edge of the entrance 76, the entrance 76 does not tear or otherwise damage the edges 14, 16 of the first and second layers 18, 20. As the layers 18, 20 of the sheet(s) 22 pass through the groove 40a, the edges 14, 16 of the layers 18, 20 contact the sides 78 (see FIG. 9) of the groove 40a to melt the edge portions 15, 17 and form the fin seal.

If the edges 14, 16 of the layers 18, 20 are misaligned, then the edge 14, 16 which is closer to the base 66 begins melting first and thus is melted more than the edge which is further away from the base. Preferably, the heaters 120 are located behind the base 66. As the edge 14, 16 that is closer to the base 66 is melted, the edges 14, 16 may become aligned.

The edge portions 15, 17 are also urged toward each other either due to the angle 64 of the slot or because the edges 14, 16 are urged toward each other by the base of the fin seal heater block. The edges 14, 16 may contact each other at the base 66a at some point 80 after the entrance 76. The edge portions 15, 17 are pushed together to force the edge portions 15, 17 together and apply pressure on the edge portions 15, 17 to form the short fin seal. By way of example and not limitation, only the distal 1/64" to 1/8" portion (preferably distal 1/32" to 1/16" portion) of the edge portions 15, 17 are heated and joined to each other to minimize waste.

The fin seal may be short by controlling the amount of heat that is transferred into the edge portions 15, 17 of the layers 18, 20. By way of example and not limitation, a groove depth may be shallow so that only a small distal edge portion 15, 17 is heated to a high enough temperature sufficient so that when the edge portions 15, 17 are pushed together, only such short distal edge portions 15, 17 are fused together. Also, the angle 70 of the base 66 may be controlled so that only a small distal edge portion 15, 17 is capable of contacting the fin seal heater block, and thus capable of applying pressure to the distal edge portions 15, 17 to fuse the same to each other. Pressure and heat are applied to the first and second edge portions 15, 17 of the first and second layers 18, 20 of the thermoplastic sheet(s) 22 until the edge portions 15, 17 leave the exit 68 of the fin seal heater block 26a to form the fin seal. The fin seal heater block 26a being heated melts or heats the edge portions 15, 17 to form the fin seal. The fin seal may be formed from the distal 1/64" to distal 1/8" (preferably 1/32" to distal 1/16") of the edge portions 15, 17. The linear rate of speed of the sheet(s) 22 and the distance 82 between point 80 and the exit 68 define the time that pressure and heat are applied to the edge portions 15, 17 of the first and second layers 18, 20 of the thermoplastic sheet(s) 22. Either the linear rate of speed of the sheet(s) 22 or the distance 82 may be adjusted up or down to ensure that pressure and heat are applied to the edge portions 15, 17 over a sufficient period of time so that the edge portions 15, 17 are fused together to form the fin seal after the exit 68 of the fin seal heater block 26a. The distance 82 is limited by a length 84 of the fin seal heater block. To increase or decrease the time that pressure and heat is applied to the edge portions 15, 17 of the first and second layers 18, 20, the length 84 of the fin seal heater block 26a may be increased or decreased. The length 82 may be between 1 inch and 20 inches and is preferably about 3 inches. More preferably, the length 84 may be between 1.5 inches and 22 inches and is preferably 4 inches.

Referring now to FIGS. 10-14, a second embodiment of the fin seal heater block 26b is shown. The fin seal heater block 26b may have a groove 40b with a constant depth 86b measured from an upper edge 88b of the groove 40b to a base 66b of the groove 40b. The bottom portion of the groove 40b may be rounded as shown in FIGS. 12 and 14. It is also contemplated that the bottom portion of the groove 40b may be flat (see FIG. 17).

Referring now to FIGS. 15-19, a third embodiment of the fin seal heater block 26c is shown. The fin seal heater block 26c may have a constant depth 86c and constant width 92c but additionally may have a funnel shaped entrance section 90. The depth 86b, c of the grooves 40b, c may be about 0.375 inches to about 0.060 inches and is preferably about 0.25 inches. The width 92b, c of the grooves 40b, c may be about 0.25 inches to about 0.03 inches and is preferably about 0.062 inches. The base 66 may have a curved configuration as shown in FIG. 12 or a flat bottom configuration as shown in FIG. 17. With the curved configuration, the radius of the curvature may be about 0.01 inches to about 0.125 inches and is preferably about 0.06 inches.

Figure 20:
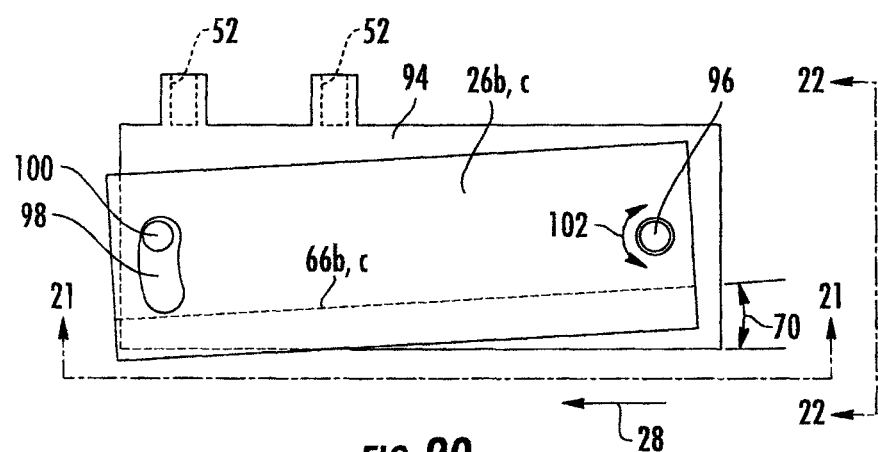
FIG. 20 is a top view of a fin seal heater block pivotally mounted to a mounting block that is mounted to the frame of the heat sealing machine.
Figure 21:
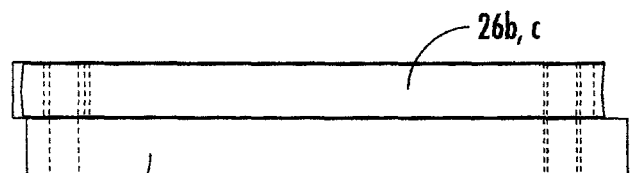
FIG. 21 is a front view of the fin seal heater block and the mounting block shown in FIG. 20.
Figure 22:
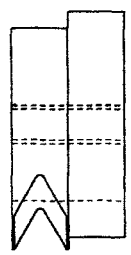
FIG. 22 is a side view of the fin seal heater block and the mounting block shown in FIG. 20.
Figure 23:
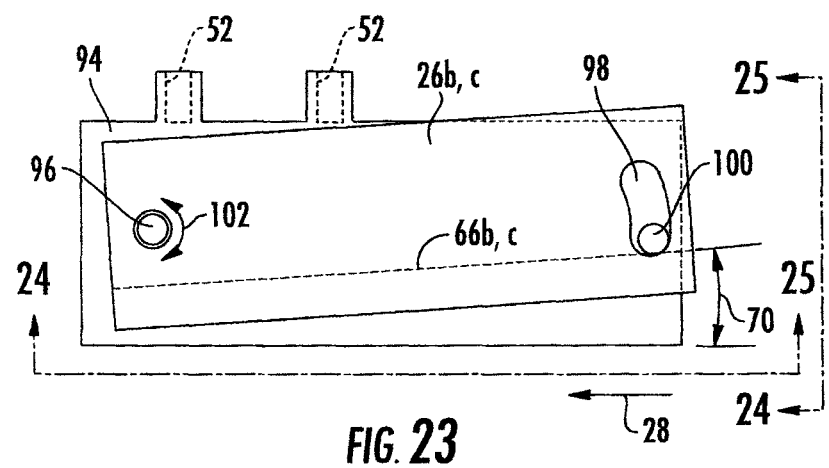
FIG. 23 is a top view of a second embodiment of an fin seal heater block pivotally mounted to the mounting block that is mounted to the frame of the heat sealing machine.
Figure 24:
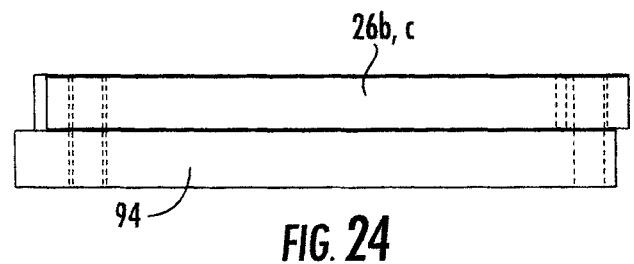
FIG. 24 is a front view of the fin seal heater block and the mounting block shown in FIG. 23.
Figure 25:
FIG. 25 is a side view of the fin seal heater block and the mounting block shown in FIG. 23.

The fin seal heater block 26b, c may be mounted to the frame 40a in the same manner described above in relation to fin seal heater block 26a. Alternatively, the fin seal heater block 26b, c may be pivotally mounted to a mounting block 94, as shown in FIGS. 21-25. The mounting block 94 may be secured to the frame 48 by way of bolts 50 that engage the threaded holes 52. The fin seal heater blocks 26b, c may be pivotally attached to the mounting block 94 with a pin 96. On the other side of the fin seal heater block 26b, c, there may be a curved slot 98 and a pin 100 that can limit angular rotation 102 of the fin seal heater block 26b, c about pin 96. The pin 100 may also be capable of setting the angular rotation 102 of the fin seal heater block 26b, c in relation to the mounting block 94. In this manner, the skewed angle 70 of the base 66b, c of the fin seal heater block 26b, c may be adjusted and optimized for the thermoplastic sheet(s) 22, the speed of the thermoplastic sheet(s) 22 and other factors in forming the fin seal 12. The configuration shown in FIGS. 20-22 is different from the configuration shown in FIGS. 23-25 in that the angular rotation 102 is controlled at the downstream end of the fin seal heater block 26b, c in FIGS. 20-22 and the upstream end of the fin seal heater block 26b, c in FIGS. 23-25.

Figure 26:
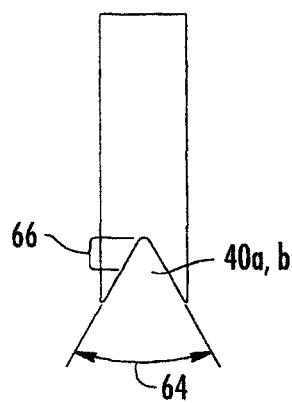
FIG. 26 illustrates a base having a round cross section along the entire length of the groove of the fin seal heater block.
Figure 27:
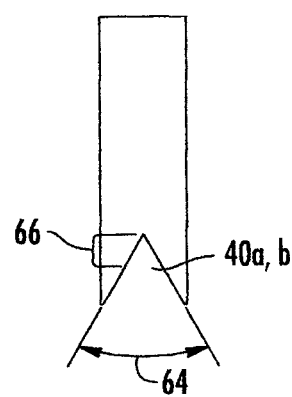
FIG. 27 illustrates a base having a pointed cross section along the entire length of the groove of the fin seal heater block.
Figure 28:
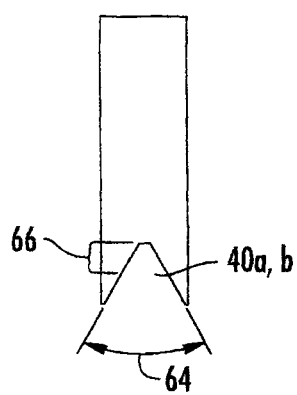
FIG. 28 illustrates a base having a truncated funnel cross section along the entire length of the groove of the fin seal heater block.
Figure 29:
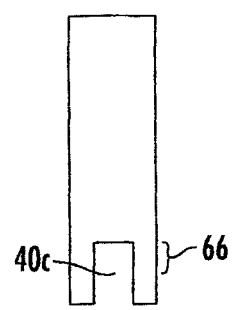
FIG. 29 illustrates a base having a flat bottom cross section along the entire length of the groove of the fin seal heater block.

Referring now the FIGS. 26-28, as discussed above, the groove 40a, b may have an angle 64 associated therewith. Alternatively, the groove 40c may have a constant width as shown in FIG. 29. The base 66 may have a rounded bottom as shown in FIG. 26, a pointed bottom as shown in FIG. 27 or truncated bottom as shown in FIG. 28. Additionally, the base may have a flat bottom as shown in FIG. 29. It is also contemplated that there may be no groove but the entire side surface which contacts the distal edge portions 15, 17 may be flat. In FIGS. 15-19, the groove 40c is shown as having a funnel shaped entrance section 90. However, the funnel shaped entrance section may also be incorporated into the other embodiments of the fin seal heater block 26a, b. Additionally, the groove 40c shown in FIGS. 15-19 may be straight running along the entire length of the fin seal heater block 26c without the funnel shaped entrance section 90.

Figure 30:
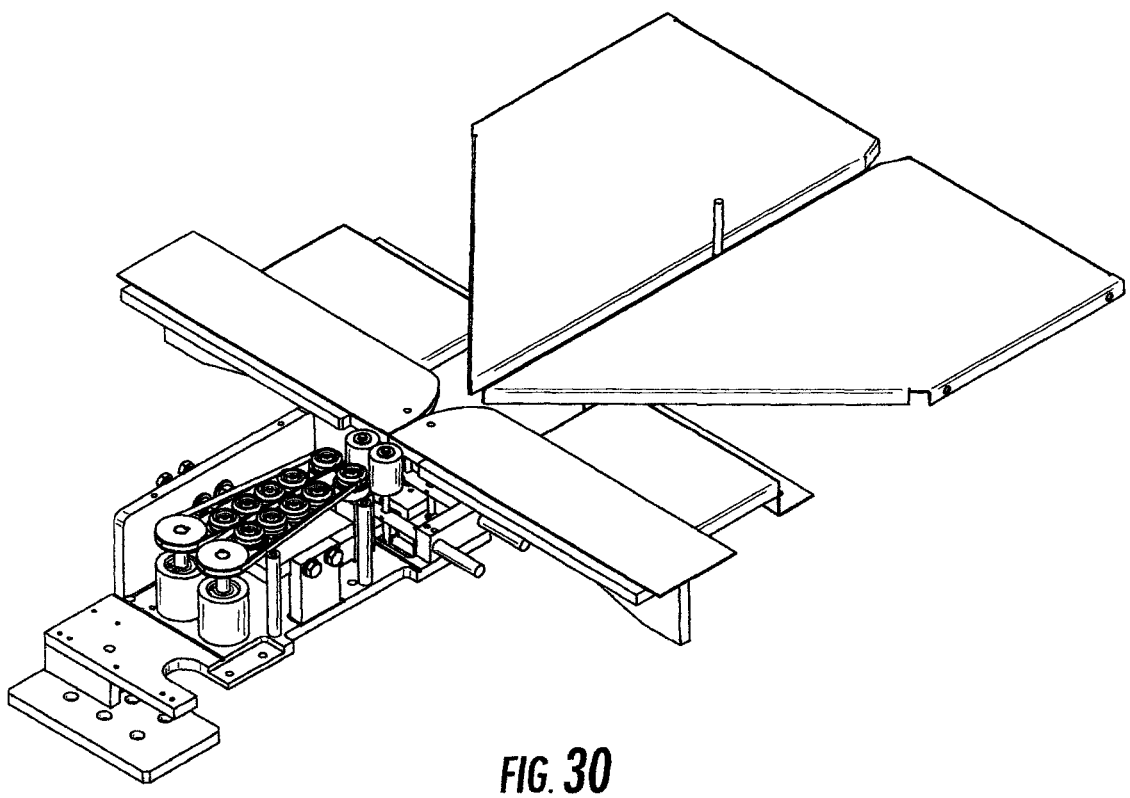
FIG. 30 illustrates the film fin sealing device mountable to a bottom side of the heat sealing machine to form a bottom fin seal.

Referring now to FIGS. 1 and 29, the fin seal 12 is shown as being formed on a lateral side of the product 30 in FIGS. 1-4. However, it is also contemplated that the fin seal heater block 26 may be positioned below the product 30 as shown in FIG. 30 in order to form a bottom edge seal. It is also further contemplated that the fin seal heater block 26 may be positioned above the product 30 to form a top edge seal.

The fin seal heater blocks 26a, b, c may be fabricated from a non-stick material or also have an anti-friction coating and/or nonstick coating. More particularly, the coating may be specifically applied to the surfaces of the groove 40a, b, c which contact the first and second layers 18, 20 and the edges 14, 16 of the thermoplastic sheet(s) 22. The coating may be selected from Teflon, polytetrafluoroethylene, ceramics, silicone, nickel, stainless steel, seasoned iron or combinations thereof. The coating on the surfaces of the groove 40a, b, c allow the thermoplastic sheet(s) 22 to slide and not buckle or twist as the edges 14, 16/edge portions 15, 17 of the thermoplastic sheet(s) 22 are being melted and joined to each other.

The fin seal heater blocks 26a, b may also be fabricated from a material having a high coefficient of heat transfer. By way of example and not limitation, the material for the fin seal heater blocks 26a, b, c may be aluminum, stainless steel, titanium, mild steel, iron, ceramic or alloys thereof.

Figure 31:
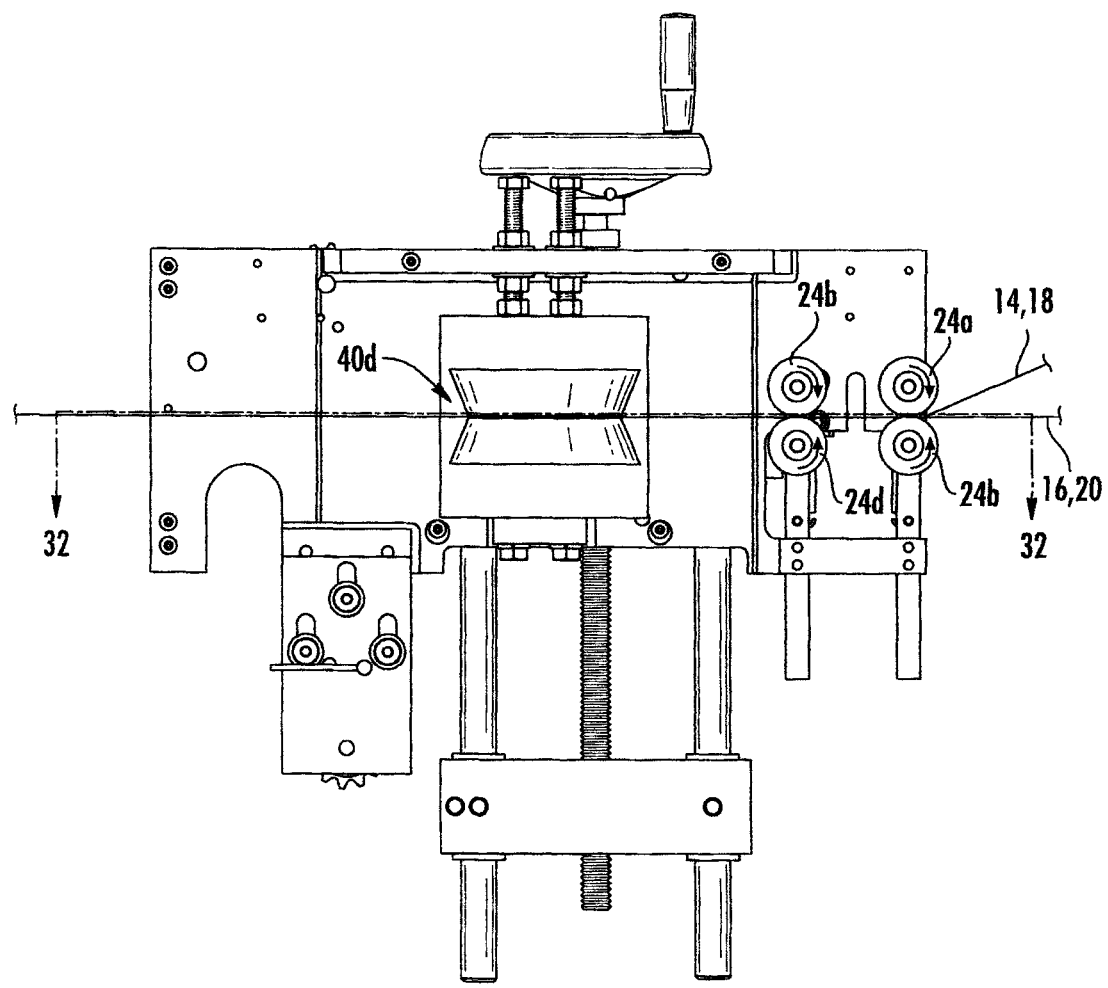
FIG. 31 illustrates a front view of a rotating fin seal heater block.

The fin seal heater blocks 26a, b, c are all depicted as having a base 66a, b, c which is straight. However, it is also contemplated that the base 66a, b, c may have a concaved configuration including but not limited to parabolic, circular or other configurations that apply a non-linear progressive pressure to the edges 14, 16 or the edge portions 15, 17 of the thermoplastic sheet(s) as the first and second layers 18, 20 of the sheet(s) 22 are fed past the fin seal heater block or through the groove 40a, b, c of the fin seal heater block. By way of example and not limitation, the dashed line 104 in FIG. 16 illustrates one particular configuration. A leading portion is straight whereas a rear portion of the base is curved. Another embodiment of the fin seal heater block is shown in FIGS. 31 and 32. A rotating fin seal heater block 26d may be used instead of the stationary fin seal heater blocks 26a, b, c previously discussed. The product is disposed between the upper and lower layers 18, 20 of the thermoplastic sheet(s) and the edges 14, 16 of the layers 18, 20 contact a bottom base 66d of a groove 40d. A heater may be connected to the rotating fin seal heater block 26d in order to heat up the fin seal heater block 26d to a temperature so as to be sufficient to heat the sheet 22 and melt the same so that the edge portions 15, 17 of the layers 18, 20 of the sheet(s) can be melted and fused together when pushed toward the base 66d of the groove 40d and to each other to form the fin seal 12.

Referring now back to FIG. 4, the pinch rollers 24a, b and the pinch rollers 24c, d may be rotatable about a vertical axis 110, 112. Rotational arrows 116, 118 illustrate rotation of the rollers 24a, b and the rollers 24c, d. By rotating the rollers 24a, b and 24c, d, the edges 14, 16 of the first and second layers 18, 20 of the thermoplastic sheet(s) 22 may be latterly controlled in order to determine the point at which the edges 14, 16 contact the base 66 of the fin seal heater block 26 as the thermoplastic sheet(s) 22 is fed through the fin seal heater block 26. By rotating the rollers 24a, b and 24a, d counterclockwise, the edges 14, 16 are pushed away from the base 66 of the fin seal heater block 26. Conversely, when the rollers 24*a, b* and 24*a, d* rotate in the clockwise direction, the edges 14, 16 are traversed closer to the base 66 of the fin seal heater block 26.

Referring to FIGS. 7, 13 and 18, the edges 14, 16 of the thermoplastic sheet(s) 22 are generally aligned (i.e., at the same level) to the base 66 of the fin seal heater block 26*a, b, c*. However, it is also contemplated that the base 66 of the fin seal heater block 26*a, b, c* may be angled upward or downward so that the sides 78 of the grooves 40*a, b, c* apply pressure to the distal edge portions 15, 17 of the thermoplastic sheet(s) 22 as the distal edge portions 15, 17 pass through the grooves 40*a, b, c*. The entrance 76 may be aligned to the vertical height or position of the edges 14, 16 and the exit 68 may be positioned slightly higher or lower than the entrance 76.

The fin seal heater block 26*a, b* was described so that the edges 14, 16 of the thermoplastic sheet(s) 22 melt and the distal edge portions 15, 17 fuse to each other when the edges 14, 16 and the distal edge portions 15, 17 contact and push against the base of the grooves 40*a, b, c* of the fin seal heater block 26*a, b, c*. However, it is also contemplated that the edges 14, 16 and the distal edge portions 15, 17 of the thermoplastic sheet(s) 22 may be heated and melted by way of radiant heat from the fin seal heater block 26*a, b, c*. In this regard, the edges 14, 16 and the distal edge portions 15, 17 of the thermoplastic sheet(s) 22 do not contact the fin seal heater block 26*a, b, c*. Rather, the fin seal heater block 26*a, b, c* is heated to a sufficient degree so that the radiant heat melts the edges 14, 16 and the distal edge portions 15, 17. Pressure may be applied to the heated distal edge portions 15, 17 after the distal edge portions 15, 17 exit the fin seal heater block 26*a, b, c* by a set of pinch rollers downstream of the fin seal heater block 26*a, b, c*. Alternatively, a set of pinch belts may be used downstream of the fin seal heater block 26*a, b, c* in lieu of the set of pinch rollers. The fin seal heater block 26*a, b, c* provides the heat to the distal edge portions 15, 17. The set of pinch rollers or pinch belts provide the necessary pressure to fuse the distal edge portions 15, 17 together. The time that the distal edge portions 15, 17 spend between the pinch rollers or pinch belts may be sufficient to provide the necessary conditions so that the heat and the pressure fuses the distal edge portions 15, 17 to form the fin seal.

It is also contemplated that in lieu of the fin seal heater block 26*a, b, c*, the pinch belts 38*a, b* may be laterally shifted over so that the pinch belts 38*a, b* is disposed over the edges 14, 16 and the distal edge portions 15, 17 of the thermoplastic sheet(s) 22. The pinch belts 38*a, b* may be replaced with metallic belts that are connected to a heater to heat the same. The metallic belts can be heated to a transition temperature or melt temperature of the thermoplastic sheet(s) 22. The edges 14, 16 of the distal edge portions 15, 17 of the thermoplastic sheet(s) 22 would be heated with the heat emanating from the metallic pinch belts 38*a, b* and the metallic pinch belts 38*a, b* would apply the necessary pressure to the distal edge portions 15, 17 to form the fin seal. The width of the metallic pinch belts 38*a, b* would determine the size of the fin seal.

The above description is given by way of example, and not limitation. Given the above disclosure, one skilled in the art could devise variations that are within the scope and spirit of the invention disclosed herein, including various ways of mounting the fin seal heater block to the frame of the heat sealing machine. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A heat sealing machine for forming a fin seal on a folded thermoplastic sheet or two stacked layers of thermoplastic sheets when wrapping a product, the heat sealing machine comprising:
   a stand for holding a roll of folded thermoplastic sheet or the two stacked layers of thermoplastic sheets;
   a heater mechanism;
   a blade-less fin seal heater block attached to the heater mechanism, the heater mechanism configured for heating the fin seal heater block, the fin seal heater block disposed adjacent to edges of first and second layers of the thermoplastic sheet(s), the fin seal heater block having a groove along a length of the fin seal heater block, a base of the groove oriented at a skew angle with respect to the edges of the first and second layers of the thermoplastic sheet(s) so that the edges of the first and second layers of the thermoplastic sheet(s) approaches the base of the groove and contacts the base to seal distal edge portion of the first and second layers together to form the fin seal as the thermoplastic sheet(s) is fed through the heat sealing machine,
   wherein the groove includes an entrance configured to receive the edges of the first and second layers into the groove and an exit configured for egress of the edges of the first and second layers from the groove, the entrance and exit spaced apart along a length of the groove,
   further comprising a conveyor adjacent to the stand for traversing the product towards a fin sealing mechanism wherein the product is disposed between first and second layers of the folded thermoplastic sheet(s), and wherein the skew angle of the groove base and the longitudinal direction of the conveyor is between negative 3 degrees to 20 degrees, and
   wherein the thermoplastic sheets are not cut by the fin seal heater block.

2. The machine of claim 1 wherein the skew angle is between zero degrees and 2 degrees to allow the edges of the first and second layers to maximize contact with the base of the groove to melt and fuse the edge portions of the first and second layers together.

3. The machine of claim 1 wherein the fin seal heater block reaches a temperature sufficient to melt the thermoplastic sheet.

4. The machine of claim 1 wherein the base of the fin seal heater block is straight or curved.

5. The machine of claim 1 wherein the groove defines a slot angle between 180 degrees and zero degrees.

6. The machine of claim 1 wherein an exterior surface of the groove has an anti-friction coating or properties and/or anti-stick coating or properties.

7. The machine of claim 1 wherein a width of the groove is between 3 inches and 0.03 inches.

8. A blade-less fin seal heater block mountable to a heat sealing machine, the fin seal heater block comprising:
   a body disposed adjacent to first and second layers of a folded thermoplastic sheet or stacked thermoplastic sheets, the body having a base being oriented at a skew angle with respect to a longitudinal direction of the thermoplastic sheet(s) so that edges of the first and second layers of folded thermoplastic sheet or stacked thermoplastic sheets directly contact the base of the body as the edges of the first and second layers of the thermoplastic sheet(s) are fed through the heat sealing machine and the body is adapted to be connected to a heat source to conduct heat from the heat source to the base of the body to heat and seal the edge portions of the first and second layers of the thermoplastic sheet(s) together to form a fin seal;

upper and lower sides adjacent to the base of the fin seal heater block to maintain the edge portions of the first and second layers of the thermoplastic sheet(s) on the base as the thermoplastic sheet(s) is fed through the heat sealing machine wherein the upper and lower sides and the base define a groove, wherein the groove includes an entrance configured to receive the edges of the first and second layers into the groove and an exit configured for egress of the edges of the first and second layers from the groove, the entrance and exit spaced apart along a length of the groove, and further comprising a conveyor and wherein the skew angle of the base and the longitudinal direction of the conveyor is between negative 3 degrees and 20 degrees, and wherein the thermoplastic sheet(s) is not cut by the fin seal heater block.

9. The fin seal heater block of claim 8 wherein the skew angle is between zero degrees and 2 degrees to allow the edges of the first and second layers to maximize contact with the base of the groove to melt and fuse the edges of the first and second layers together.

10. The fin seal heater block of claim 8 wherein a base of the groove having a maximum width of 2 inches.

11. The fin seal heater block of claim 8 wherein the block is pivotable with respect to a mounting block to adjust the skew angle of the base of the groove of the body.

12. The fin seal heater block of claim 8 wherein the base has one of a rounded cross sectional configuration, a pointed cross sectional configuration, a truncated cross sectional configuration or a flat bottom.

13. The fin seal heater block of claim 8 wherein the groove and the body are circular.

14. A heat sealing machine for forming a fin seal of a folded thermoplastic sheet or two stacked layers of thermoplastic sheets when wrapping a product, the machine comprising:

a stand for holding a roll of folded thermoplastic sheet or the two stacked layers of thermoplastic sheets;
a conveyor;
a heater mechanism;
a blade-less fin seal heater block attached to the heater mechanism, the heater mechanism configured for heating the fin seal heater block, the fin seal heater block disposed adjacent to edges of first and second layers of the thermoplastic sheet(s), the fin seal heater block having a base oriented at a skew angle with respect to the edges of the first and second layers of the thermoplastic sheet(s) so that the edge portions of the first and second layers of the thermoplastic sheet(s) approaches the base and contacts the base to heat and seal the first and second edge portions together to form the fin seal as the thermoplastic sheet(s) is fed through the heat sealing machine, the skew angle of the base and a longitudinal direction of the conveyor is between negative 3 degrees and 20 degrees;

upper and lower sides adjacent to the base of the fin seal heater block to maintain the edge portions of the first and second layers of the thermoplastic sheet(s) on the base as the thermoplastic sheet(s) is fed through the heat sealing machine; and a set of pinch rollers or belts disposed adjacent to the fin seal heater block for controlling forward travel of the edges of the first and second layers of the thermoplastic sheet(s) as the edge portions of the first and second layers of the thermoplastic sheet(s) are fed against the base of the fin seal heater block, wherein the upper and lower sides and the base define a groove, and the groove includes an entrance configured to receive the edges of the first and second layers into the groove and an exit configured for egress of the edges of the first and second layers from the groove, the entrance and exit spaced apart along a length of the groove, and wherein the thermoplastic sheet(s) is not cut by the fin seal heater block.

15. The machine of claim 14 wherein the upper and lower sides are integral with the fin seal heater block.

16. The machine of claim 14 wherein the set of pinch rollers or belts comprise first and second of pinch rollers positioned upstream of the fin seal heater block and one set of pinch belts laterally adjacent to the fin seal heater block.

* * * * *

UNITED STATES PATENT AND TRADEMARK OFFICE
CERTIFICATE OF CORRECTION

PATENT NO. : 10,661,509 B2
APPLICATION NO. : 16/038017
DATED : May 26, 2020
INVENTOR(S) : Raymond Uttaro Page 1 of 1

It is certified that error appears in the above-identified patent and that said Letters Patent is hereby corrected as shown below:

On the Title Page

1. In Item (71), under "Applicant", in Column 1, Line 1, delete "APRAC, LLC," and insert -- ARPAC, LLC, --, therefor.

In the Specification

2. In Column 5, Line 10, delete "an fin" and insert -- a fin --, therefor.

3. In Column 6, Line 37, delete "product 28" and insert -- product 30 --, therefor.

4. In Column 6, Line 40, delete "product 28" and insert -- product 30 --, therefor.

5. In Column 7, Line 64, delete "24a," and insert -- 24c, --, therefor.

6. In Column 12, Line 67, delete "24a," and insert -- 24c, --, therefor.

7. In Column 13, Line 3, delete "24a," and insert -- 24c, --, therefor.

Signed and Sealed this
Tenth Day of November, 2020

Andrei Iancu
*Director of the United States Patent and Trademark Office*